(No Model.)
W. L. DECKER.
VELOCIPEDE.
No. 513,675. Patented Jan. 30, 1894.
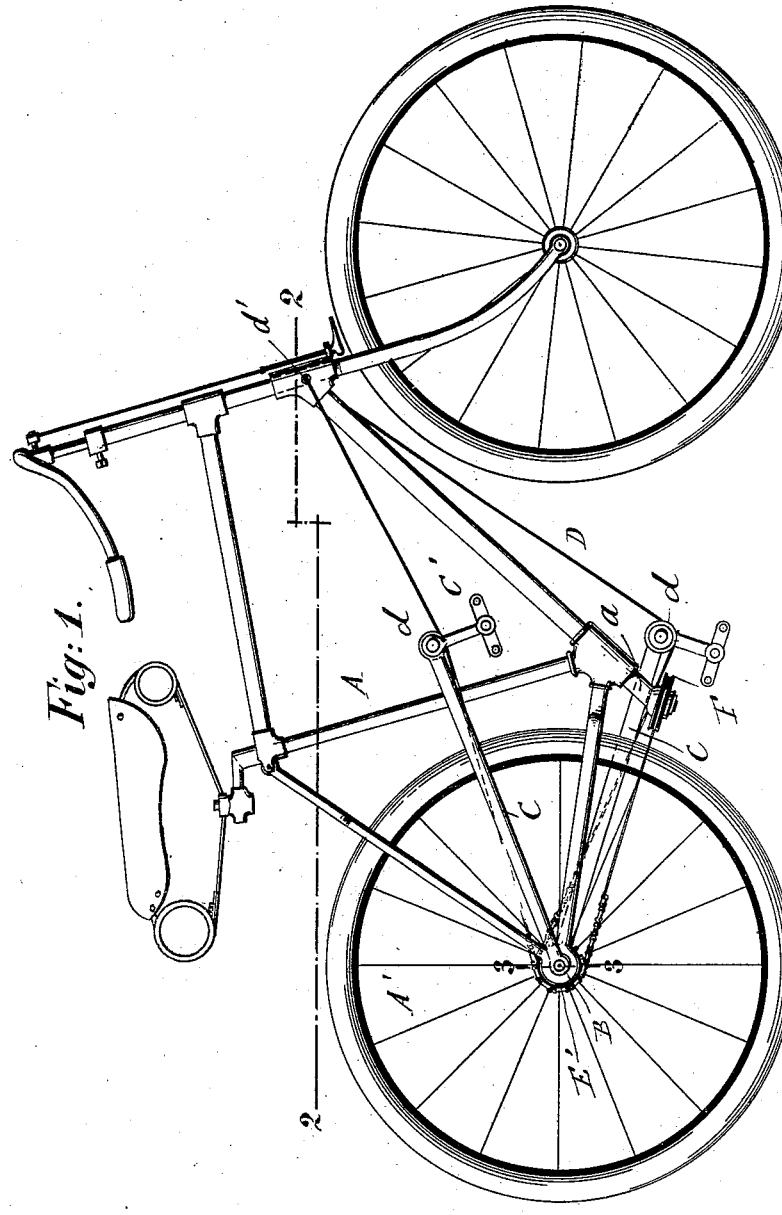
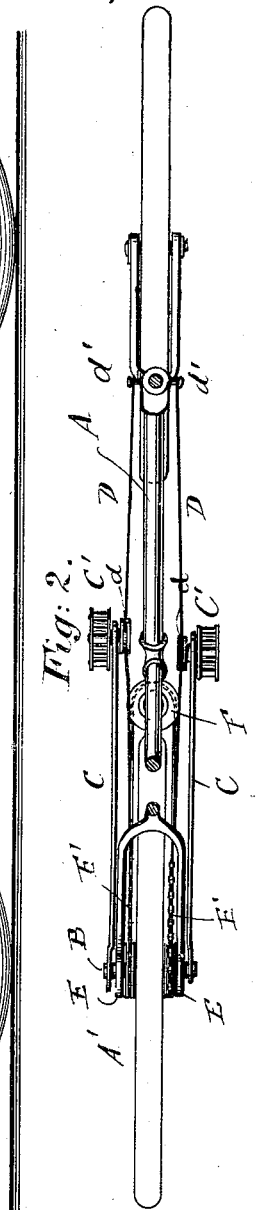
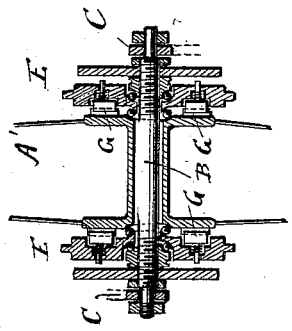
WITNESSES:
Charles Schroeder
Chas. Hable
INVENTOR
W. L. Decker
BY Gaspel & Ruegner
ATTORNEYS.
THE NATIONAL LITHOGRAPHING COMPANY,
WASHINGTON, D. C.

UNITED STATES PATENT OFFICE.

WILLIAM L. DECKER, OF PLAINFIELD, NEW JERSEY, ASSIGNOR OF ONE-THIRD TO JOHN H. DECKER, OF BROOKLYN, NEW YORK.

VELOCIPEDE.

SPECIFICATION forming part of Letters Patent No. 513,675, dated January 30, 1894.

Application filed September 28, 1893. Serial No. 486,688. (No model.)

*To all whom it may concern:*

Be it known that I, WILLIAM LLOYD DECKER, a citizen of the United States, and a resident of Plainfield, Union county, State of New Jersey, have invented certain new and useful Improvements in Velocipedes, which are set forth in the annexed specification.

This invention relates to certain improvements in velocipedes, whereby the motion is imparted, in place of rotary pedals and chain and sprocket-wheel connections with the rear wheel, by means of oscillating levers provided with pedals and a funicular transmission, by means of which a greater speed can be imparted to the velocipedes with less fatigue to the rider; and the invention consists of a velocipede, the rear axle of which is provided with oscillating levers which carry at their outer ends on rigid arms the actuating pedals, said levers being provided with rollers that rest on steel or other ropes which are attached to pins of the front-fork, and adapted to engage by means of short chain-pieces, loose sprocket-wheels on the rear axle sprocket-wheels engaging by pawl and ratchet device the rear wheel when turned in one direction. The steel wire passes from the sprocket-wheel at one side of the axle around the roller at the lower end of the supporting-frame of the velocipede, back again and over the sprocket-wheel at the other side of the axle and below the roller on the actuating lever to the front fork, so that the alternating depression of the levers imparts by the steel wire a rotary motion to the rear wheel axle.

In the accompanying drawings, Figure 1 represents a side elevation of my improved velocipede. Fig. 2 is a plan view, partly in horizontal section on line 2—2, Fig. 1. Fig. 3 is a vertical transverse section, drawn on a larger scale, taken on line 3—3, Fig. 1, and showing the connection of the sprocket-wheel with the hub of the rear wheel.

Similar letters of reference indicate corresponding parts.

Referring to the drawings, A represents the frame of a bicycle or other velocipede, which is made of any approved shape and construction, and provided with front and rear forks by which the connection of the axles of the front and rear wheels is made. To each end of the rear axle B is applied an oscillating pedal-lever, C, which is provided with a short downwardly-extending arm at its front end, which arm carries the oscillating pedal C'. Each oscillating pedal-lever C is provided at the angle with its pedal-carrying arm with a guide-roller $d$ that rests on a steel wire or rope D, the ends of which are attached to laterally-projecting pins $d'$ of the front fork of the main frame A, the wire or rope extending from one side of the fork below the roller of one pedal-lever C, and by means of a short piece of chain E', around a sprocket-wheel E that is applied loosely by means of ball-bearings to the rear axle B, the steel wire or rope passing then around an inclined guide-pulley F that is supported by the short extension —$a$— of the main frame A, as shown clearly in Fig. 1, back to the other side of the rear wheel and over a second sprocket-wheel E on the opposite side of the axle, then in forward direction below the guide-roller of the opposite pedal-lever C to a fixed pin $d$, at the opposite side of the front fork, as shown clearly in Figs. 1 and 2. Between the sprocket-wheels E and the hub of the rear wheel A, are interposed suitable spring-pawls G, which are forced into mesh with teeth on the hub when the sprocket-wheels are moved in the forward direction by the action of the funicular transmitting device, so as to move thereby the rear wheel in the forward direction, while during the return motion of the wire-rope the sprocket-wheel is turned loosely on the axle without meshing with the projecting teeth on the hub of the rear wheel.

By the alternate depression of the pedal-levers motion is transmitted to the rear wheel, first, by the downward motion of one lever, then by the downward motion of the other lever, no motion being transmitted to the rear wheel by the return motion of either pedal-lever, in connection with the funicular transmission, producing the very effective conversion of the rotary reciprocating motion of the pedal-levers into the rotary motion of the rear wheel, and thereby the forward propulsion of the velocipede.

Owing to the length of the pedal-levers, a greater speed is obtained by the oscillating strokes of the same than by the crank motion and sprocket-wheel transmission heretofore employed.

Having thus described my invention, I claim and desire to secure by Letters Patent—

The combination, with a main-frame of a velocipede, of oscillating pedal-levers applied to the rear-axle, pedals on the front-ends of said levers, rollers on the front-ends of said levers, an inclined guide-pulley supported on the main-frame, loose sprocket-wheels on the rear-axle, a pawl and ratchet device between the sprocket-wheels and the hub of the rear-wheel, and a steel wire or rope that extends from the front fork, below the guide-roller of one pedal-lever, around one sprocket wheel and around the guide-pulley and over the sprocket-wheel at the other side of the rear wheel, then under the guide-roller of the other pedal-lever to the front-fork, the portions of the wire or rope that extend over the sprocket-wheels being made in the form of chains, whereby by the oscillating motion of the pedal-levers and the funicular transmission of the wire-rope continuous rotary motion is imparted by said rope to the sprocket-wheels and thereby to the rear wheel, substantially as set forth.

In testimony that I claim the foregoing as my invention I have signed my name in presence of two subscribing witnesses.

WILLIAM L. DECKER.

Witnesses:
PAUL GOEPEL,
CHARLES SCHROEDER.